United States Patent [19]
Todd et al.

[11] Patent Number: 6,163,835
[45] Date of Patent: Dec. 19, 2000

[54] METHOD AND APPARATUS FOR TRANSFERRING DATA OVER A PROCESSOR INTERFACE BUS

[75] Inventors: David William Todd; Michael Dean Snyder, both of Austin; Brian Keith Reynolds, Round Rock; Michael Julio Garcia, Austin, all of Tex.

[73] Assignee: Motorola, Inc., Schaumburg, Ill.

[21] Appl. No.: 09/110,351

[22] Filed: Jul. 6, 1998

[51] Int. Cl.[7] .................................................. G06F 15/16
[52] U.S. Cl. ............................................. 712/34; 709/208
[58] Field of Search ............................ 712/34; 709/211, 709/208, 216; 710/105, 126

[56] References Cited

U.S. PATENT DOCUMENTS

| | | | |
|---|---|---|---|
| 5,528,764 | 6/1996 | Heil | 710/113 |
| 5,790,831 | 8/1998 | Lin | 710/101 |
| 5,799,161 | 8/1998 | Merrick | 710/129 |
| 5,870,568 | 2/1999 | Culley | 710/101 |
| 5,884,027 | 3/1999 | Garbus | 709/250 |

OTHER PUBLICATIONS

Intel Corp. 1996, Pentium Pro Family Developer's Manual, vol. 1: Specfications, Section 4.3.1. Bus Protocol pp. 4–21—4–32.

Motorola Inc. 1997, MPC106 PCI Bridge/Memory Controller User's Manual, Section 4.4.5 60x Local Bus Slave Support, pp. 4–21—4–22.

Motorola Inc. 1995, MPC105 PCII Bridge/Memory Controller User's Manual, Section 4.4.5. 60x Bus Slave Support, pp. 4–21—4–22.

Digital Equipment Corp. 1997, Digital Semiconductor Alpha 21164PC Microprocessor Hardware Reference Manual, Order #EC–R2W0A–TE, http://www.digital.com/semiconductor, pp. 3–1—4–60.

David M. Fenwick et al., Digital Technical Journal 1995, The AlphaServer 8000 Series: High–end Server Platform Development, vol. 7, No. 1, pp. 43–63.

Sun Microelectronics Jul. 1997, STP1–31, UltraSPARC™–ll, Data Sheet: Second Generation SPARC v9 64–Bit Microprocessor With VIS, pp. 1–41.

Integrated Device Technology Feb. 1996, IDT R5000™RISC Microprocessor, Processor Bus interface Reference Manual, Version 10, pp. 1–1—4–39.

William R. Bryg, et al. Hewlett–Packard Journal Feb. 1996, A High–Performance, Low–Cost Multiprocessor Bus for Workstations and Midrange Servers, pp. 1–7.

Hewlett–Packarg Journal Feb. 1996, Runway bus Electrical Design Considerations, pp. 1–3.

Advanced Micro Devices, Inc. (AMD), Section 4 Logic Symbol Diagram and Selection 5 Signal Descriptions, pp. 5–1—6–45.

Intel, Pentium™pro processor with 1 mg L2 Cache at 200 MHZ, Appendix a signal listing, pp. 60–76.

Intel, Pentium™Processor at 233 MHZ, 266 MHZ, 300 MHZ and 333 MHZ, Appendix A, pp. 83–90.

*Primary Examiner*—Eric Coleman
*Attorney, Agent, or Firm*—Joanna P. Gariazzo

[57] ABSTRACT

A method of transferring data between a slave device (20) in communication with a processor interface bus (34) where the processor interface bus is in communication with a master device (12) including receiving an address from the processor interface bus (34) where the address was provided by the master device (block 302). A first signal is asserted (blocks 318 and 324) on the processor interface bus (34) to indicate that the slave device (20) is servicing a data transfer transaction. A second signal is asserted (block 320) on the processor interface bus (34) to indicate whether data to be transferred using the processor interface bus (34) is to be stored in main memory (36) by a main memory controller (32) in communication with the processor interface bus (34). The data is transferred (block 326) between the slave device (20) and the processor interface bus (34).

23 Claims, 5 Drawing Sheets

METHOD AND APPARATUS FOR TRANSFERRING DATA OVER A PROCESSOR INTERFACE BUS

FIELD OF THE INVENTION

This invention relates generally to transferring data, and more specifically to transferring data over a processor interface bus.

BACKGROUND

Presently, various bus protocols are typically used to handle data transfer for local bus slave devices which contain cacheable or non-cacheable data that does not reside in main memory. A separate bus protocol is typically used for transferring cacheable data residing in main memory directly from one cache to another. Since each of the various bus protocols has a different set of control pins, the more protocols that are used within a system, the more control pins are required as well, thereby increasing system costs and complexity. Therefore, there is a need for a more efficient and less expensive bus protocol to support both cache-to-cache transfers and data transfers involving a local bus slave device.

DETAILED DESCRIPTION

Generally, the present invention relates to a method and apparatus for transferring data over a processor interface bus. In one embodiment, the method relates to transferring data between a slave device in communication with a processor interface bus, where the processor interface bus is in communication with a master device. The method includes the steps of receiving an address from the processor interface bus that was provided by the master device, asserting a first signal on the processor interface bus to indicate that the slave device is servicing the associated data transfer transaction, and asserting a second signal on the processor interface bus to indicate whether data to be transferred using the processor interface bus is to be stored in main memory by a main memory controller in communication with the processor interface bus. The data is then transferred between the slave device and the processor interface bus.

In another embodiment, the method relates to transferring data between a slave device in communication with a processor interface bus, where the processor interface bus is in communication with a master device. The method includes receiving an address from the processor interface bus where the address is provided by the master device, asserting a first signal on the processor interface bus to indicate that the slave device is servicing the associated data transfer transaction, and asserting a second signal on the processor interface bus to indicate whether data to be transferred using the processor interface bus is to be stored in main memory by a main memory controller in communication with the processor interface bus. A third signal is asserted on the processor interface bus to indicate that the slave device is ready to perform the data transfer transaction. The data is then transferred between the slave device and the processor interface bus.

In yet another embodiment, the method relates to transferring data from an external source to a processor interface bus in communication with a plurality of devices. The method includes receiving data and an associated memory address at a controller responsive to the processor interface bus from an external data source. After determining whether the associated memory address is within a memory range for the plurality of devices, a write transaction is initiated on the processor interface bus, and the processor interface bus is monitored for a plurality of responses from the plurality of devices. Data ready signals are received over the processor interface bus from a subset of the plurality of devices. The processor interface bus is controlled and access is granted for the processor interface bus to the subset of the plurality of devices. The data received from the external data source is then transferred to the processor interface bus.

In one embodiment of the present invention, the apparatus is a data processing system that includes a processor interface bus, a memory controller responsive to the processor interface bus, a memory device responsive to the memory controller, a first device responsive to the processor interface bus operating as a master device, and a second device. The second device is responsive to the processor interface bus operating as a slave device and asserts a first signal on the processor interface bus to indicate that the slave device is servicing a data transfer transaction. The second device asserts a second signal on the processor interface bus to indicate whether data to be transferred using the processor interface bus is to be stored in the memory device by the main memory controller.

In another embodiment, the apparatus is a data processing system that includes a processor interface bus, a memory controller responsive to the processor interface bus, a memory device responsive to the memory controller, and a first device responsive to the processor interface bus operating as a master device and having a first cache. The data processing system also includes a second device that is responsive to the processor interface bus operating as a slave device and has a second cache. The processor interface bus operates in accordance with a bus protocol where the bus protocol handles a first operation including a transfer of data between the first cache memory of the first device and the second cache memory of the second device and a second operation including a transfer of data between one of the first and second devices and a local bus slave device coupled to the processor interface bus.

Figure 1:
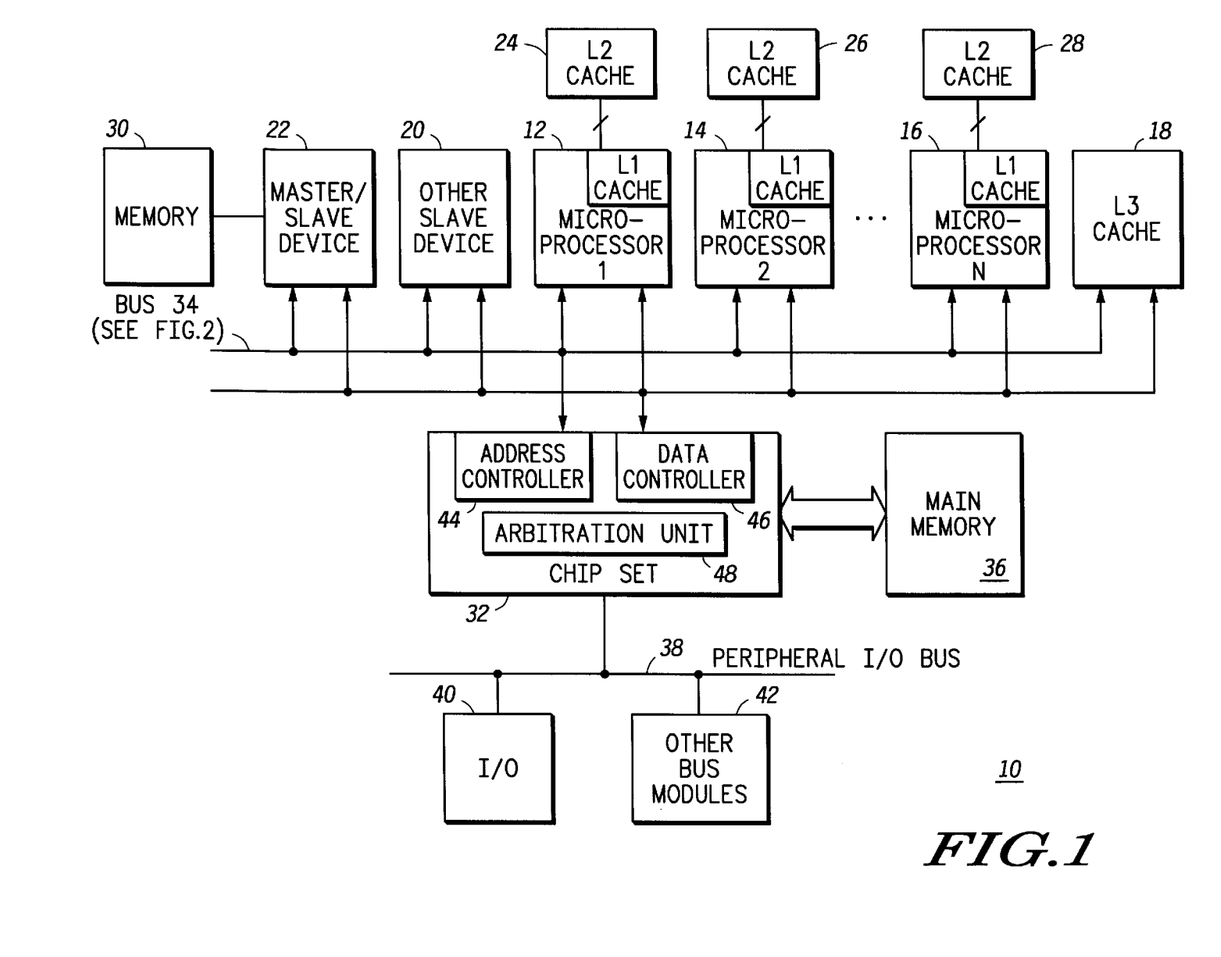
FIG. 1 is a block diagram that illustrates a data processing system according to an embodiment of the present invention.

FIG. 1 illustrates a data processing system 10 containing a first microprocessor 12, a second microprocessor 14, additional microprocessors 16 (as needed), a level three cache 18, other slave device 20, master slave device 22, and chip set 32, all coupled to processor interface bus 34. The first microprocessor 12 is coupled to a first level two cache 24 and the second microprocessor 14 is coupled to a second level two cache 26. Microprocessor 16 is coupled to level two cache 28. Memory 30 is coupled to master slave device 22. Main memory 36 is coupled to chip set 32. Chip set 32 includes address controller 44, data controller 46, and a memory controller for main memory 36 (not shown). Chip set 32 also includes a bus arbitration unit 48. Chip set 32 is also coupled to input/output device 40 and other bus modules 42 via bus 38. In one embodiment, bus 38 is a peripheral I/O bus. Alternate embodiments may include the address, data, and memory controllers as separate units outside of chip set 32, or may include all such controllers integrated within a single controller. Chip set 32 functions similarly to the chip sets found in modern desktop computer systems. Therefore, the specific functions and design of the chip set depend on the system in which it is used. The operation of data system 10 shown in FIG. 1 will be further described in reference to FIGS. 2–7.

Figure 2:
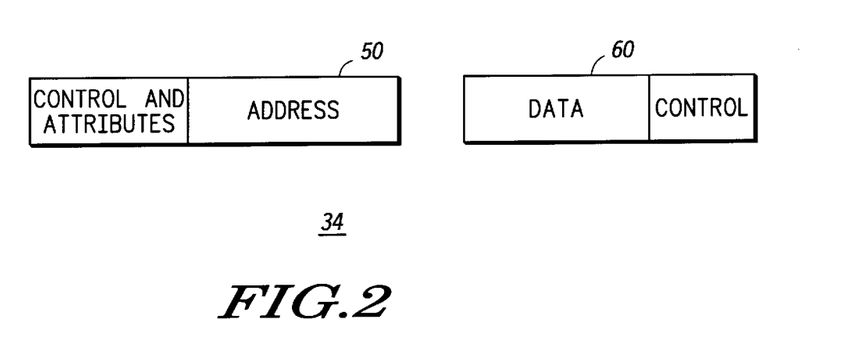
FIG. 2 is a general diagram that illustrates the bus of FIG. 1.

A particular embodiment of bus 34 of FIG. 1 is illustrated in FIG. 2. In one embodiment, the bus 34 contains two portions: an address bus 50 and its associated control and attribute bits and a data bus 60 with its associated control bits. In this embodiment, the address and data buses are de-coupled, but in an alternate embodiment the address and data can be coupled into a single bus structure. Alternate embodiments may also divide the bus into various different portions wherein the control and control and attributes are separate buses or are linked together. The bus size depends on the number of address bits, data bits, and control and attribute bits needed for the data processing system 10, and can thus vary from system to system and can be designed accordingly. Processor bus 34 functions similarly to those buses found in modern desktop computer systems. Those of ordinary skill in the art will appreciate that bus designs will vary depending on the data processing system's requirements. For example, different control signals may be needed for the processor bus in order to implement the required bus protocols.

Figure 3:
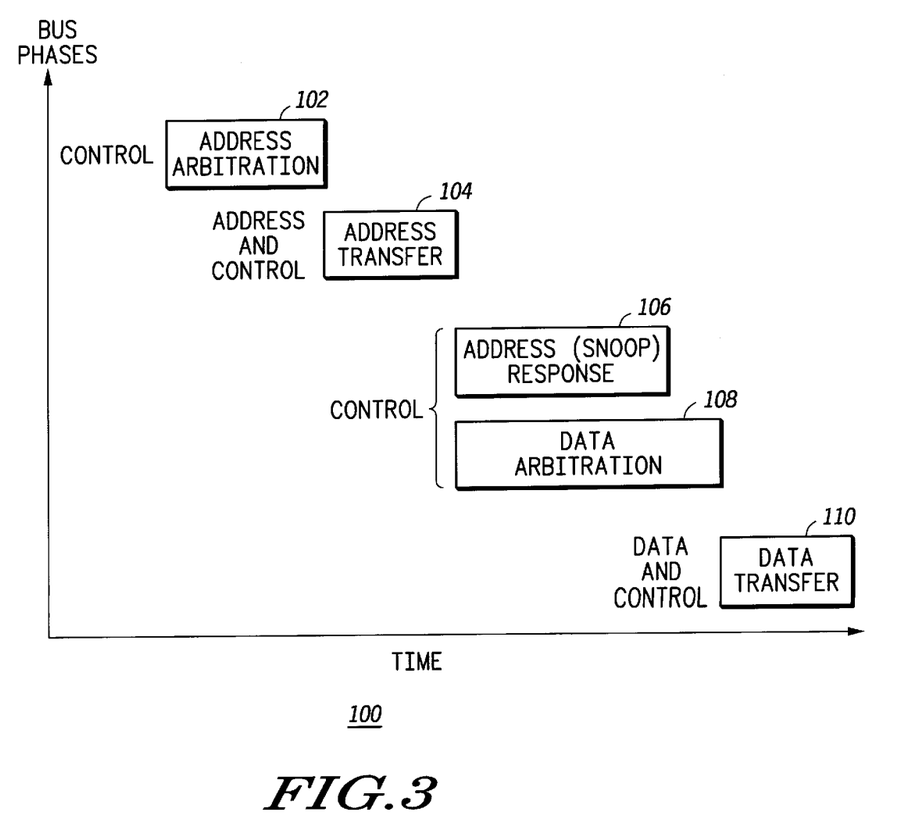
FIG. 3 illustrates in chart form the bus phases of the processor interface bus within the data processing system of FIG. 1.

FIG. 3 illustrates a high level transaction flow 100 that occurs in data processing system 10 of FIG. 1. The transaction flow includes various bus phases 102, 104, 106, 108, and 110 as they occur relatively in time. During the address arbitration phase 102, the arbitration unit 48, located in chip set 32, determines which device of those requesting the address bus 50 receives ownership of the address bus 50 for the transaction. In alternate embodiments, the arbitration unit 48 can be located outside of chip set 32 as a separate unit. Once the arbitration unit 48 makes a decision, the device having bus ownership, the master device, places a master address on the address bus 50 along with associated control bits during address transfer phase 104. During the address (snoop) response phase 106, the other devices coupled to bus 34 snoop, or monitor, the address bus 50 to determine whether they need to respond to the master address. For a given transaction, the device requesting the transaction becomes the master, and the device responding to the address becomes the slave which services the master's transaction request.

During the data arbitration phase 108, the device that contains the data associated with the master address then requests ownership of the data bus 60. Ownership of the data bus 60 allows the device that contains the data to control the information on the data bus 60 during the transaction. Once the arbitration unit 48 grants the data bus 60 to the device or devices that requested it, data transfer phase 110 occurs, and the data is transferred between the master and slave devices. Note that in alternate embodiments, some of the bus phases can occur simultaneously or sequentially in time as required by the design of data processing system 10. Also, in alternate embodiments, bus phases for subsequent transactions can be overlapped (or pipelined) with bus phases for previous transactions. Furthermore, the data transfer phases for different transactions can be reordered with respect to their associated address phases.

Figure 4:
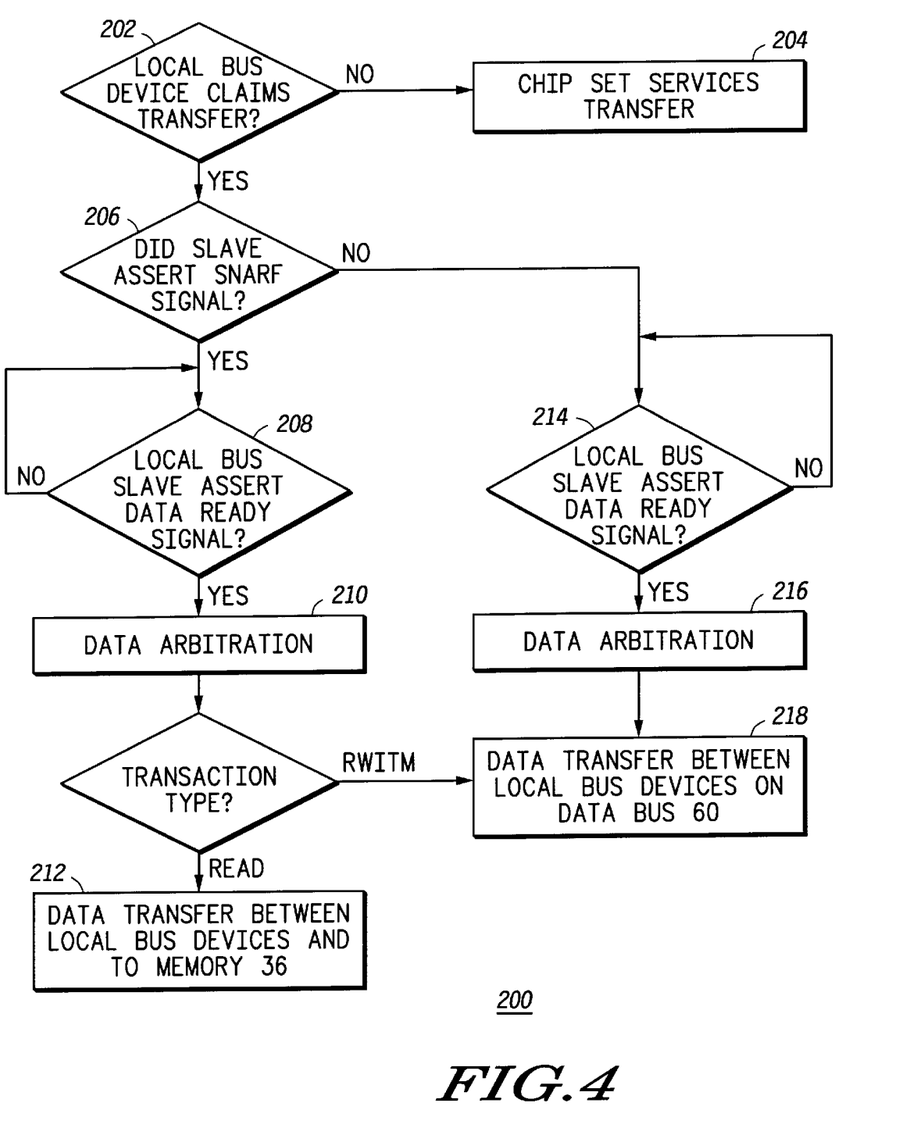
FIG. 4 is a flowchart that illustrates a particular method performed within bus phases 106, 108, and 110 of FIG. 3.

FIG. 4 illustrates a flow diagram 200 depicting an illustrative data transfer transaction over bus 34 using chip set 32. Flow diagram 200 begins within snoop response phase 106 of FIG. 3 with decision diamond 202. Local bus devices refer to those devices coupled to bus 34, such as device 22, 20, 12, 14, and 18. If no local bus device claims the transaction after snooping the address, chip set 32 then services the transaction itself as shown in block 204. If, on the other hand, a local bus device, such as master slave device 22 or other slave device 20, claims the transaction, flow continues to decision diamond 206. If the local bus device claims the transaction and asserts a snarf signal, the local bus device has accepted a transaction (thus becoming the slave device) and alerted chip set 32 that main memory 36 needs to be updated. In one embodiment of the present invention, the local bus slave device asserts the snarf signal when it has modified the data being requested and thus wants to write the updated data to main memory 36 as well as to the requesting device. In alternate embodiments, the local bus slave device (e.g. a write-through cache) may assert the snarf signal when receiving data from another device so that the data will also be forwarded to main memory 36. In yet another embodiment, chip set 32 may default to snarf mode unless a don't_snarf signal is asserted by the slave device. In this case, data is written to main memory 36 unless a signal is asserted to indicate not to snarf.

Once the local bus slave device is ready for the data transfer (decision diamond 208), the local bus slave device asserts a data ready signal which alerts the arbitration unit 48 that the local bus slave device is requesting the data bus 60 (block 210). If the transaction type originally requested by the master is a read, then a snarf operation is carried out and the data transfer between the local bus slave device and the master occurs in block 212, as well as a write of the data to main memory 36. On the other hand, if the transaction is a read-with-intent-to-modify (RWITM), the data transfer between the local bus slave device and the master device occurs, but no data is written to main memory 36 (as shown in block 218).

If at decision diamond 206, the slave device did not assert the snarf signal, then no writes to main memory 36 are necessary for this transaction. The local bus slave device asserts the data ready signal once the data is ready for transfer (at decision diamond 214), requesting control of the data bus 60. Upon being granted control of the data bus 60 in block 216, the data transfer between the local bus slave device and the master device occurs on data bus 60, in block 218.

In one embodiment of the present invention, the master may be a microprocessor such as one of the microprocessors 12, 14, or 16, or master/slave device 22, and the slave may be another microprocessor, level three cache 18, master/slave device 22, or other slave device 20. In a particular embodiment, master/slave device 22 can be a graphics controller with memory 30 as its frame buffer. In a particular embodiment, the other slave device 20 can be a cache controller, a memory controller for a memory having addresses outside of main memory 36, or a special purpose co-processor. Alternate embodiments may also include only one microprocessor and various combinations of master/slave devices and other slave devices.

Figure 5:
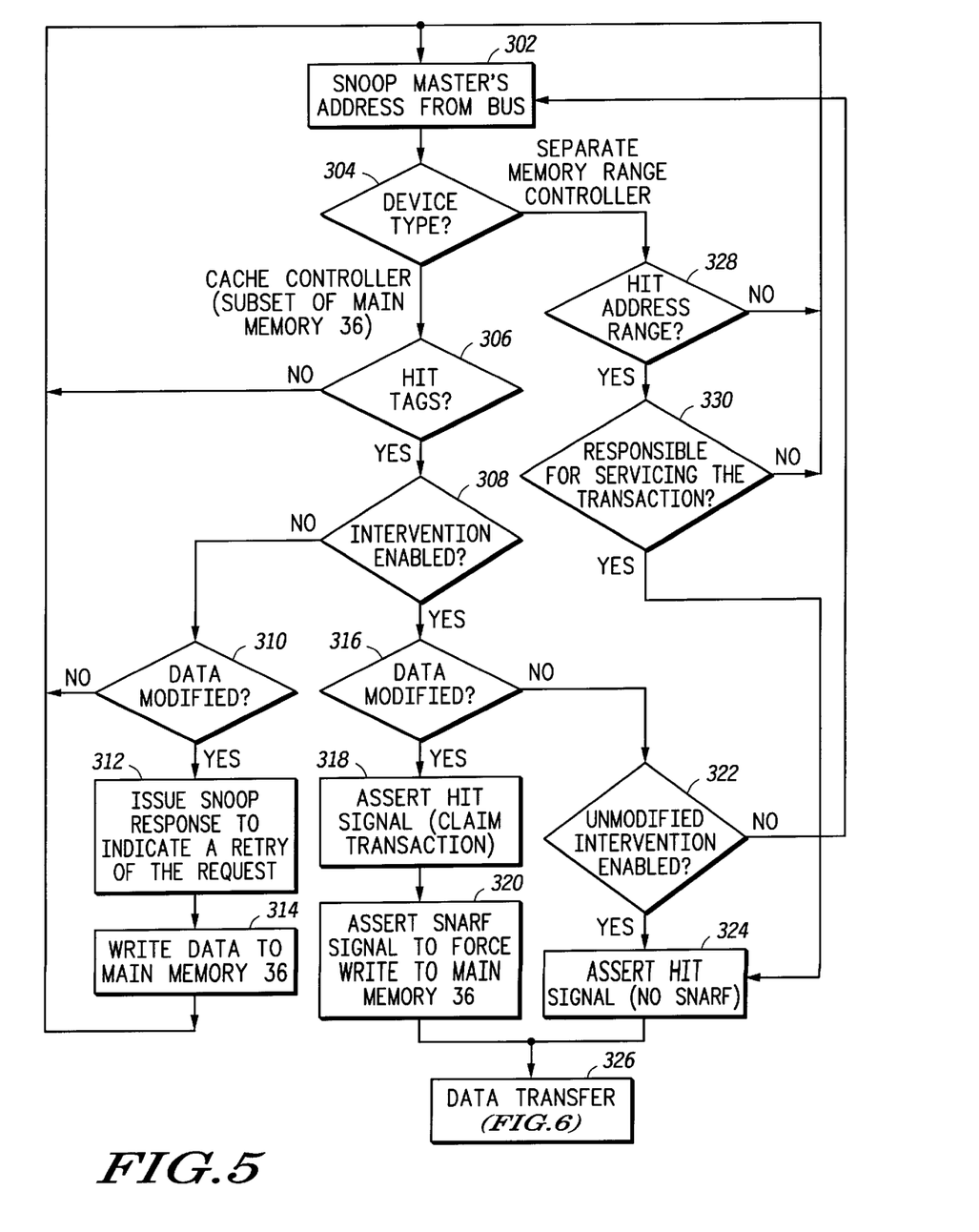
FIG. 5 is a flowchart that illustrates a method of communicating between the bus and a slave during bus phases 104, 106, 108, and 110 of FIG. 3.

FIG. 5 is a flow diagram of a local bus device transferring data using bus 34. The local bus device snoops the master's address from the address bus 50, in block 302, and, depending on the device type (decision diamond 304), follows a particular method of determining whether it will service the address with a data transfer. If the local bus device is a cache controller (thus having a caching function), then the local bus device's memory is a subset of main memory 36. For example, in FIG. 1, level two cache 24 and the first cache found within microprocessor 12 are subsets of main memory 36. In this case, memory coherency is a concern between main memory 36 and the subset of main memory 36 such as level two cache 24 or the first cache. If a device requests data, the device that contains the requested data needs to access the most recently updated version of the data.

However, if the local bus device is a separate memory range controller, then it contains a separate memory range that is not found in main memory 36. For example, in FIG. 1, memory 30 (such as a frame buffer for a graphics controller) can be a separate memory range not found in main memory 36.

If the local bus device is a cache controller and the address snooped on the address bus 50 is found within its associated cache, such as when the address matches a tag within the cache, then a memory hit occurs. If, at decision diamond 306, a memory hit does not occur, flow returns to block 302. In one embodiment, an intervention protocol for the bus 34 may be programmably enabled or disabled for cache to cache intervention. Alternatively, intervention may be enabled or disabled in hardware. The intervention protocol, if enabled, allows for data transfers directly between local bus devices, such as cache to cache transfers between processors, instead of having to transfer data to and from main memory 36.

If intervention is not enabled (decision diamond 308) and the data being requested has not been modified by the local bus slave device (decision diamond 310), then the local bus slave device has completed its transaction, and the master will receive the data from main memory 36 rather than from the local bus slave device. Flow then returns to block 302. However, if the data has been modified, the local bus slave device issues a snoop response indicating a retry request in block 312. A retry request alerts the master that the data in main memory 36 is not the modified version and to wait and retry its transaction request at a later time. The local bus slave device then writes the modified data to main memory 36, in block 314. At this point, the local bus slave device has completed its transaction, and the data within the local bus slave device is no longer marked as modified. Flow then returns to block 302. The master may now re-request its transaction and will read the updated data from main memory 36.

If, on the other hand, intervention is enabled at decision diamond 308, transactions directly between local bus devices are allowed. If intervention is enabled and the data being requested has been modified by the local bus slave device (decision diamond 316), the local bus slave device will claim the transaction by asserting a first signal, also referred to as a hit signal, in block 318. The local bus slave device will also assert a second signal, also referred to as a snarf signal, in order to force a write of the modified data value to main memory 36 (block 320). Therefore, even though the master will transfer data directly to or from the local bus slave device, main memory 36 will also receive an updated copy of the data. Flow then continues to the data transfer step in block 326 which is further described below in reference to FIG. 6.

The intervention protocol not only allows for modified intervention, but for unmodified intervention as well, as illustrated by decision diamond 322. Unmodified intervention allows for local bus device transfers even if the data has not been modified by the local bus device and could therefore also be retrieved from main memory 36. If the data has not been modified and unmodified intervention is not enabled, then the local bus slave device has completed its transaction, and the master device will get its information from main memory 36. Flow once again returns to block 302. However, if unmodified intervention is enabled and the data has not been modified by the local bus slave device, the local bus slave device will assert the hit signal without asserting the snarf signal (block 324) so that no snarfing will occur. Snarfing is not necessary in this case because the data was not modified; therefore, no write to main memory 36 is required since main memory 36 already has a most recent version of the data. Flow then continues to the data transfer of block 326.

If the device type discussed above at decision diamond 304 is a separate memory range controller, then upon snooping the master address, the local bus slave device determines at decision diamond 328 that a memory hit occurs if the master address falls within its memory range. If a memory hit occurred and the local bus slave device is responsible for servicing the transaction (decision diamond 330), then the local bus slave device will claim the transaction by asserting the hit signal at block 324. Once again, no snarfing is required since the local bus device's memory range is outside of main memory 36. Thus, a write to main memory 36 is not required and is not desired since the address location does not even exist in main memory 36. At this point, we have reached the data transfer step of block 326.

Figure 6:
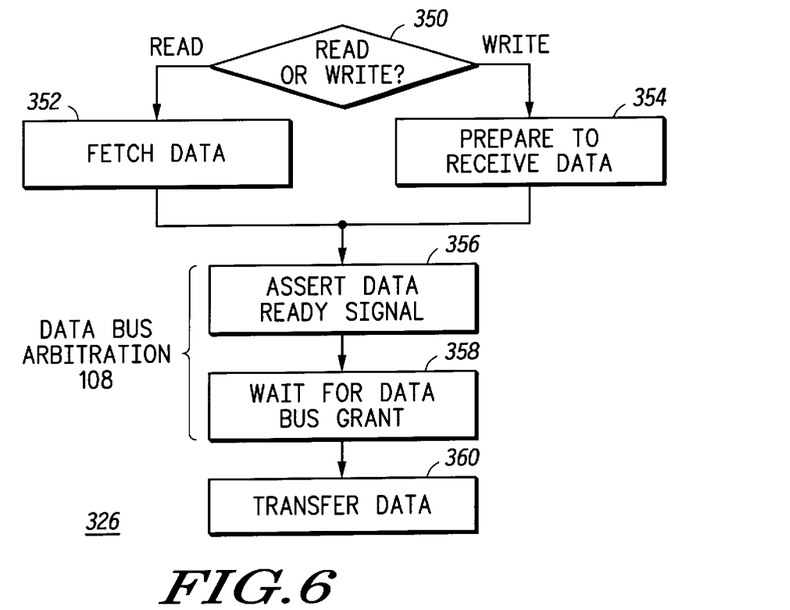
FIG. 6 is a flowchart that illustrates the data transfer step of FIG. 5.

FIG. 6 illustrates the data transfer step 326 to or from the local bus slave device. If the transaction type is a read (decision diamond 350), the local bus slave device fetches the data to be sent to the master device in block 352. If the transaction is a write, the local bus slave device prepares to receive the data from the master device, in block 354. In a read transaction, the slave is the device that will provide the data, while in a write transaction, the master is the device that will provide the data. Once the slave device is ready for the transfer to proceed, it will request the data bus 60 by asserting a third signal, also referred to as a data ready signal, in block 356. At this point, the device providing data to be transferred will wait for access to the data bus 60 (block 358). Once ownership of the data bus 60 is granted, the device that is providing the data transfers the data as shown in block 360 by placing the data on the data bus 60 to be received by the receiving device (and written to its memory or cache).

In one embodiment, the data bus 60 and address bus 50 are decoupled (as shown in FIG. 2) such that the data bus 60 is free to be used by other devices while the local bus slave device fetches the data or prepares to receive the data. In this manner, the data bus 60 is free for other use until the arbitration unit 48 grants ownership of the data bus 60 to the local bus slave device after having received the data ready signal. In an alternate embodiment, slave devices are assumed to be able to receive data from a master device, during a write transaction, immediately. In this case, it is not necessary for the slave to assert a data ready signal when it claims a write from the master.

One embodiment of the present invention uses a combination of three signals as described above. The hit signal is asserted by the local bus slave device when a memory hit occurs, the data ready signal is sent when the data is ready to be transferred, and the snarf signal is asserted when snarfing is to occur thus allowing the data to be forwarded to main memory 36. These signals allow for a single protocol to support both cache-to-cache transfers and reads and writes involving local bus slave devices and main memory 36 (as was described in reference to FIGS. 2–6). Since only three signals are required for this common protocol in this embodiment, no more than three control pins of bus 34 would be necessary to achieve the protocol in data processing system 10. In a particular embodiment, only two control pins are used to implement the protocol by time multiplexing the hit signal and the snarf signal onto a single pin by asserting the hit signal for an additional cycle after the snoop response window in order to indicate that data does not need to be snarfed to main memory 36. This can be referred to as the extended hit protocol, which requires only one control pin for the hit and snarf signals since they can be asserted sequentially over this common pin.

The snoop window refers to how long chip set 32 will wait to receive snoop responses from the slave devices snooping the master address. In one embodiment, this snoop window can be of a fixed length, or it can be programmable within data processing system 10 by the user. In alternate embodiments, different methods may be used to determine when a hit signal or a snarf signal has been asserted by any of the slave devices.

The above embodiments have several benefits. For example, the use of only two control pins for providing cache to cache transfer and selectible use of writes to main memory lowers both system cost and complexity. Using a single protocol for a variety of differing transactions, such as slave device and inter processor cache transfer, allows for a corresponding variety of differing system and software functions to be conveniently and cost effectively executed on a data processing system using such a protocol. Thus, the above embodiments address the need for a low cost and efficient bus protocol that supports both cache-to-cache transfer and data transfer involving local bus slave devices. Although, those of ordinary skill in the art will appreciate that alternate embodiments may require the use of more control pins, different signals, or a different encoding of groups of signals to accomplish the common protocol.

Figure 7:
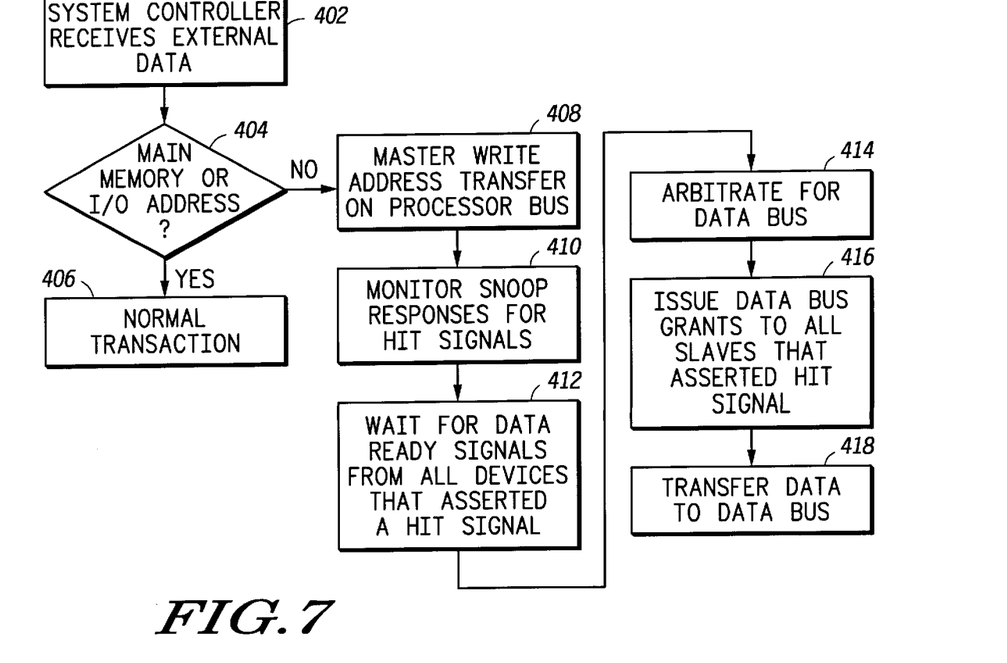
FIG. 7 is a flowchart that illustrates a method of broadcasting according to one embodiment of the present invention.

FIG. 7 illustrates another embodiment of the present invention that allows for a broadcast protocol. In this embodiment, the system controller, in block 402, receives external data from one of the I/O 40 or other bus modules 42 found on bus 38. If the system controller, at decision diamond 404, determines that the external data resides in main memory 36 or the I/O address ranges, then a normal transaction follows (block 406), and a broadcast is not performed. If the external data does not fall within main memory 36 or the I/O address ranges, the device broadcasting the write transaction masters the write address onto bus 34 (block 408). In an alternate embodiment, the broadcasting device may recognize an address range for which data must be both copied to main memory 36 and broadcasted to the local bus devices on bus 34. All of the devices on bus 34, whether they be master or slave devices, monitor the bus to snoop the address in order to determine whether the address falls within their memory range (block 410). If so, the devices whose memory range contains the master address will claim the transaction by asserting a hit signal as their snoop response. The device that generated the broadcast, such as the arbitration unit 48 of chip set 32, monitors the snoop responses from all of the other devices for hit signals.

In one embodiment, the broadcast is generated by chip set 32, while in alternate embodiments any master device on bus 34 may generate the broadcast. Once the devices on bus 34 are ready to accept the broadcasted write from chip set 32, the devices request ownership of the data bus 60 by asserting their data ready signals. Once the arbitration unit 48 receives all of the data ready signals from each of the devices that asserted a hit signal (blocks 412 and 414), the arbitration unit 48 grants ownership of the data bus 60 to each of these devices and to the master device (block 416). The data will then be transferred onto the data bus 60 in block 418 so that each of the devices that asserted the hit signal will be able to sink the data (read the data from bus 34 and write the data to their memory or cache). Once the data is transferred to the slave devices, the transaction is complete.

Although the present invention has been described with reference to specific embodiments, further modifications and improvements will occur to those skilled in the art. Also, those skilled in the art can appreciate that variations in design and elements may still accomplish the functions of the present invention. Therefore, it is to be understood that the invention encompasses all such modifications that do not depart from the scope of the invention as defined in the appended claims, and equivalents thereof.

What is claimed is:

1. A method of transferring data between a slave device in communication with a processor interface bus, the processor interface bus in communication with a master device, the method comprising the steps of:

receiving an address from the processor interface bus, the address provided by the master device;

asserting a first signal on the processor interface bus to indicate that the slave device is servicing a data transfer transaction;

asserting a second signal on the processor interface bus to indicate whether data to be transferred using the processor interface bus is to be stored in main memory by a main memory controller in communication with the processor interface bus; and transferring the data between the slave device and the processor interface bus.

2. The method of claim 1, wherein the data transfer transaction is a read operation and further comprising the step of determining whether a cache to cache intervention operation is enabled for the slave device.

3. The method of claim 1, further comprising the step of storing the data from the processor interface bus to the external memory if the second signal has been asserted.

4. The method of claim 1, further comprising the step of determining whether the data to be transferred has been modified.

5. The method of claim 4, wherein the second signal is not asserted when the data to be transferred has been modified.

6. The method of claim 4, wherein the second signal is asserted when the data to be transferred has not been modified.

7. The method of claim 1, wherein the first signal and the second signal are asserted sequentially over a common pin of the processor interface bus.

8. The method of claim 1, wherein the second signal is not asserted as a default to indicate that the data is to be stored to the main memory.

9. The method of claim 1, wherein assertion of the second signal is optional, depending on configuration data of the slave.

10. The method of claim 1, further comprising the step of determining whether the data to be transferred is unmodified data and whether cache to cache intervention is enabled for unmodified data.

11. The method of claim 1, further comprising the step of transferring the data to the master but not to main memory.

12. A data processing system comprising:

a processor interface bus;

a memory controller responsive to the processor interface bus;

a memory device responsive to the memory controller;

a first device responsive to the processor interface bus operating as a master device; and a second device responsive to the processor interface bus operating as a slave device, the second device asserting a first signal on the processor interface bus to indicate that the slave device is servicing a data transfer transaction and asserting a second signal on the processor interface bus to indicate whether data to be transferred using the processor interface bus is to be stored in the memory device by the main memory controller.

13. The system of claim 12, wherein the first device has a first cache and wherein the second device has a second cache.

14. The system of claim 13, wherein data from the second cache is transferred to the first cache over the processor interface bus.

15. A data processing system comprising:

a processor interface bus;

a memory controller responsive to the processor interface bus;

a memory device responsive to the memory controller;

a first device responsive to the processor interface bus operating as a master device and having a first cache; and a second device responsive to the processor interface bus operating as a slave device and having a second cache;

the processor interface bus operating in accordance with a bus protocol, the bus protocol handling a first operation including a transfer of data between the first cache memory of the first device and the second cache memory of the second device and handling a second operation including a transfer of data between one of the first and second devices and a local bus slave device coupled to the processor interface bus.

16. The system of claim 15, wherein the second device asserts a first signal on the processor interface bus to indicate that the second device is servicing the first operation and the local bus slave device asserts a second signal on the processor interface bus to indicate that the local bus slave device is servicing the second operation.

17. The system of claim 16, wherein the second device asserts a third signal on the processor interface bus to indicate whether data to be transferred in the first operation using the processor interface bus is to be stored in the memory device by the main memory controller.

18. The system of claim 15, wherein the first device and the second device are data processing devices and wherein the local slave device is selected from the group consisting of a cache controller, a memory controller for memory having addresses outside of the address space of the memory device, and a special purpose co-processor.

19. The system of claim 15, further comprising a peripheral control bus coupled to the memory controller, the peripheral control bus supporting at least one peripheral device.

20. A method of transferring data between a slave device in communication with a processor interface bus, the processor interface bus in communication with a master device, the method comprising the steps of:

receiving an address from the processor interface bus, the address provided by the master device;

asserting a first signal on the processor interface bus to indicate that the slave device is servicing a data transfer transaction;

asserting a second signal on the processor interface bus to indicate whether data to be transferred using the processor interface bus is to be stored in main memory by a main memory controller in communication with the processor interface bus; and asserting a third signal on the processor interface bus to indicate that the slave device is ready to perform the data transfer transaction; and transferring the data between the slave device and the processor interface bus.

21. A method of transferring data from an external source to a processor interface bus in communication with a plurality of devices, the method comprising the steps of:

receiving data and an associated memory address at a controller responsive to the processor interface bus from an external data source;

determining whether the associated memory address is within a memory range for the plurality of devices;

initiating a write transaction on the processor interface bus;

monitoring the processor interface bus for a plurality of responses from the plurality of devices;

receiving data ready signals over the processor interface bus from a subset of the plurality of devices;

controlling the processor interface bus and granting access for the processor interface bus to the subset of the plurality of devices; and transferring the data received from the external data source to the processor interface bus.

22. The method of claim 21, wherein each of the subset of the plurality of devices receives the data transferred to the processor interface bus.

23. The method of claim 21, wherein a first device of the plurality of devices is a memory and a second device of the plurality of devices is a slave device.

* * * * *